United States Patent
Tani

(10) Patent No.: US 6,327,228 B1
(45) Date of Patent: Dec. 4, 2001

(54) DISK DEVICE

(75) Inventor: Takao Tani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/387,329

(22) Filed: Aug. 31, 1999

(30) Foreign Application Priority Data

Sep. 1, 1998 (JP) .................................. 10-246903

(51) Int. Cl.$^7$ ........................................... G11B 7/00
(52) U.S. Cl. ..................... 369/32; 369/53.44; 369/59.25; 369/275.3
(58) Field of Search .................. 369/32, 47.1, 47.11, 369/47.15, 47.21, 47.22, 47.28, 53.1, 53.11, 53.2, 53.37, 53.41, 53.44, 59.1, 59.11, 59.25, 275.1, 275.3

(56) References Cited

U.S. PATENT DOCUMENTS 6,141,036 * 10/2000 Katayama et al. ..................... 348/47

FOREIGN PATENT DOCUMENTS 5 303743  5/1993 (JP).
6 101121  6/1994 (JP).

* cited by examiner

Primary Examiner—Muhammad Edun
(74) Attorney, Agent, or Firm—Lackenbach Siegel Marzullo Aronson & Greenspan

(57) ABSTRACT

A disk device for recording data onto a disk in accordance with a predetermined layout containing a footer portion. In the disk device, upon receipt of a record command entered by a user, a CPU reads out a TDB of a track finally subjected to data recording, and judges whether or not a data recording method used for the data recording is a track-at-once recording method or a packet-writing recording method. When it is the packet-writing recording method, the CPU reads out the data located at a position precedent to a record start address by two frames, and judges whether or not the mode of the header is Ro1 (bit value=111). When it is any other than Ro1, the CPU judges that the disk rejects the recording of data thereonto, and outputs a message stating that the disk rejects the recording of data thereonto.

2 Claims, 4 Drawing Sheets

DISK DEVICE

BACKGROUND OF THE INVENTION

1. Field of the Invention

The present invention relates to a disk device for recording data onto a disk in accordance with a predetermined layout containing a footer portion.

2. Description of the Related Art

Techniques on the CD-R (compact disk recordable) disk having data stored thereon which can be read out by a CD drive or a CD-ROM drive, are under lively development.

Japanese Patent Examined Publication No. Hei. 6-101121, entitled "Optical Disk Device and Optical Disk", discloses such a technique that when a tracking error occurs during the writing of data onto a CD-R disk, an optical head is returned to the error generating track, and then the writing operation starts again to record data continuously on the optical disk.

Another technique is disclosed in Japanese Patent Unexamined Publication No. Hei. 5-303743, entitled "Playback-End Control Method for an Optical Disk Playback Device". When a tracking error occurs during the reading of data from a CD-R disk, which is under writing and not yet finalized, by a CD drive or a CD-ROM drive, the technique reads out data from a track located at a position radially outwardly counted from the error generating track by a predetermined number of tracks, and judges as to whether or not it is located at the end of the program area, whereby the reading of data at the end of the program area is smoothly ended.

The method of recording data onto the CD-R disk is roughly categorized into four methods; 1) a disk-at-once recording method, 2) a track-at-once recording method, 3) a packet-writing recording method, and 4) a multi-session recording method. Sometimes, some of those recording methods are combined in use.

In the disk-at-once recording method, a record signal is ceaselessly applied throughout a data recording process from a record start to a record end. The record signal is applied in the order from a read-in (representative of a start time (start address) and an end time (end address) of the track, a program (data to be recorded) and a read-out. The disk-at-once recording method enables one track to be formed on one disk.

In the track-at-once recording method, the record signal is applied plural times or for each of the data recording operations. This recording method allows a plural number of tracks to exist on a single disk, and programs can be additionally recorded onto the disk so long as the free memory area is left in the disk. The recording method manages the addresses of the tracks to be subjected to additional recording, by use of a PMA (program memory area), which is formed on the disk in advance, for temporarily storing address information of the respective tracks. In the finalizing process, the stored information is readout of the PMA to form retrieval information called TOC (table of contents), and the recording of a read-in area and then a read-out area is performed. Thus, the record signal is applied in the order of the program, the read-in and the read-out.

The packet-writing recording method eases the limitations on the recording unit of the track-at-once recording method. The data unit lower in rank than the track, i.e., the packet, is used for the additional recording of data. In the recording method, a plurality of packets may be stored in one track.

In the multi-session recording method, the recording of the read-in and read-out areas follows the recording of the program area. Data may be additionally recorded on the disk so long as the free recording area is left in the disk. That is, a plurality of read-in areas and read-out areas may exist on a signal disk.

An operation for additionally writing data onto a single disk by the track-at-once or packet-writing recording method will now be described.

An NWA (next writable area) representative of the next writing address is stored in the PMA (program memory area). The NWA is recorded into the PMA every time the recording to the track is completed (closed). The track-at-once recording method reads out the NWA, and sets up record start addresses of the second and subsequent recording operations (second and subsequent tracks).

In the packet-writing recording method, there is a case that the NWA is invalid since the track recording is not always completed in the previous recording operation.

In the packet-writing recording method, a LINK region is recorded in the trailing end of the packet by a series of procedural steps for recording one packet. The LINK region is used as a margin between the present packet and the next packet to subsequently be recorded.

The LINK region ranging from the readout NWA to the maximum read-out start time of the disk is searched by the binary search method. When the LINK region is not detected, the NWA is set as a record start address. When it is detected, its address is set as the record start address.

The thus set record start address is stored in the work memory of the CD-R drive while the disk is set in the CD-R drive, and is updated with the additional recording of the packet.

When the disk is discharged out of the CD-R drive, the record start address is erased from the work memory. Therefore, when the additional recording of data onto the disk is performed by the packet-writing recording method, the record start address is set up by the above procedure every time the disk is loaded into the disk drive.

Incidentally, the recording characteristic of the CD-R disk is not standardized, viz., it is different for each maker. Further, the conventional CD-R drive does not perform a verifying operation, viz., an inspection operation by comparing the recorded data with the input data to check as to if the input data has been correctly recorded.

When data is recorded onto a disk manufactured by a certain maker, it sometimes happens that data once recorded onto the disk is not recorded therein actually. In this case, when the user reads out data from the disk onto which he recorded the data, a read error occurs, and he knows his recording failure from the read error.

SUMMARY OF THE INVENTION

Accordingly, an object of the present invention is to provide a disk device which reads out, before data recording, data of a region containing a footer portion of the data finally recorded, and judges as to whether or not the disk accepts or rejects the recording of data thereonto on the basis of the presence or absence of predetermined information representative of the footer portion in the readout data of the region.

In order to achieve the above object, according to the invention, there is provided a disk device for recording data onto a disk in accordance with a predetermined layout having a footer portion identified by given attribute information, the disk device comprising: reading means for reading out data from a region containing a footer portion of data finally stored on the disk; judging means for judging whether or not attribute information indicative of the footer portion is contained in the readout region; and informing means for informing the disk rejecting the recording of data thereonto when the judging means judges that the attribute information is not contained in the region.

DETAILED DESCRIPTION OF THE PREFERRED EMBODIMENT

Figure 3:
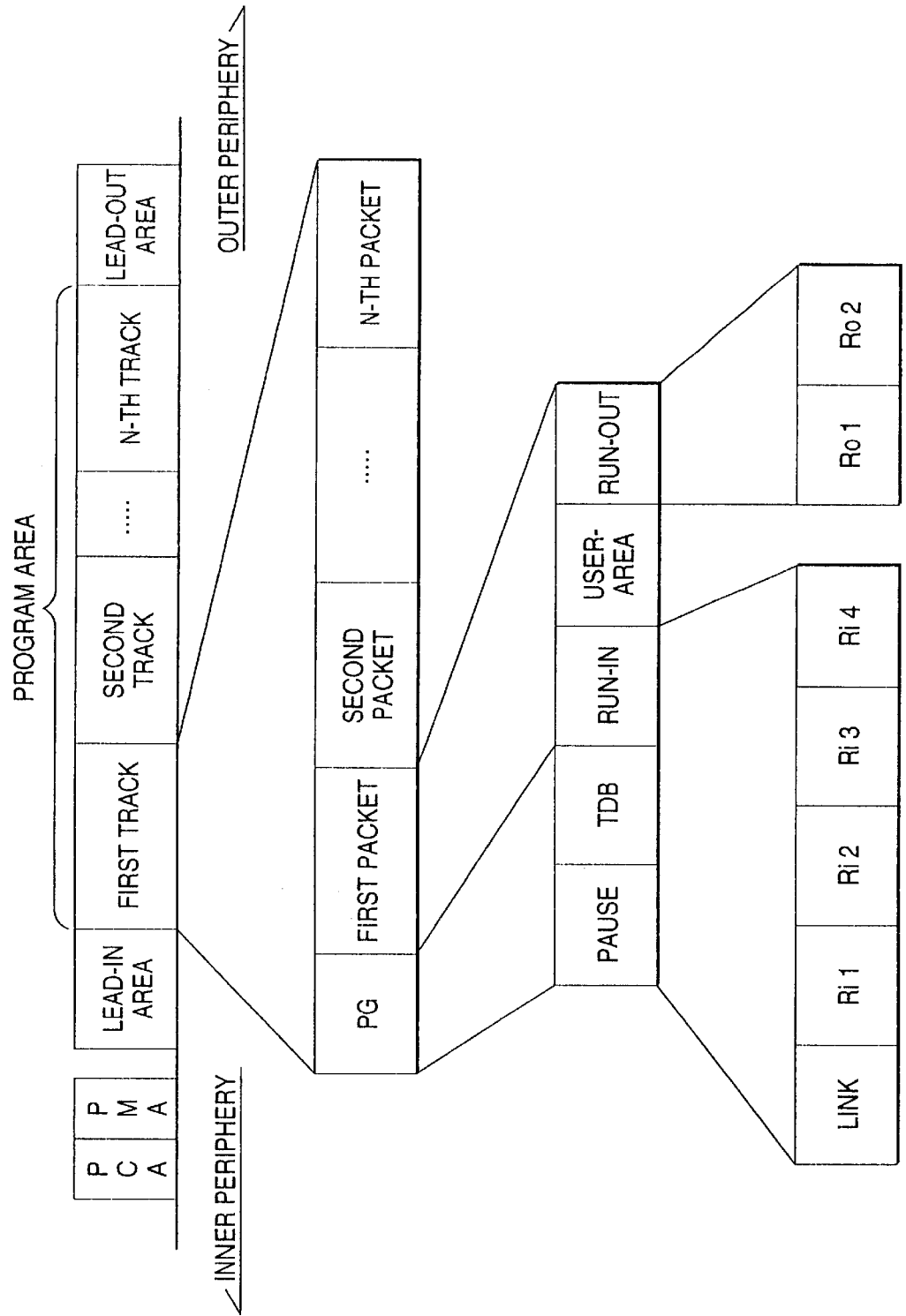
FIG. 3 is a diagram useful in explaining a layout for the packet-writing of the CD-R disk.

FIG. 3 is a diagram useful in explaining a layout for the packet-writing of the CD-R disk. As shown, a PCA (power calibration area), a PMA (program memory area), a read-in area, a program area and a read-out area are laid out on the disk in this order from the inner periphery side to the outer periphery side. The PCA area is provided for calibrating laser power at the time of recording.

A plurality of tracks are provided in the program area. A pregap (PG) is located at the start of each track. The PG is for separating one track from its adjoining track. A plurality of packets follows the PG. The PG contains a PAUSE of one-second time duration, and a TDB (track descriptor block) for storing attribute information of the track. Specifically, the TDB stores information indicative of a recording method used for recording data into the track, the track-at-once recording method or the packet-writing recording method. Each packet consists of RUN-IN, USER-AREA and RUN-OUT.

The RUN-IN may be divided into four frames; LINK, Ri1, Ri2, Ri3 and Ri4, arranged in this order from the head of the RUN-IN. The USER-AREA stores information to be recorded, and consists of one or a plurality of frames. The RUN-OUT may be divided into two frames; Ro1 and Ro2.

Figure 4:
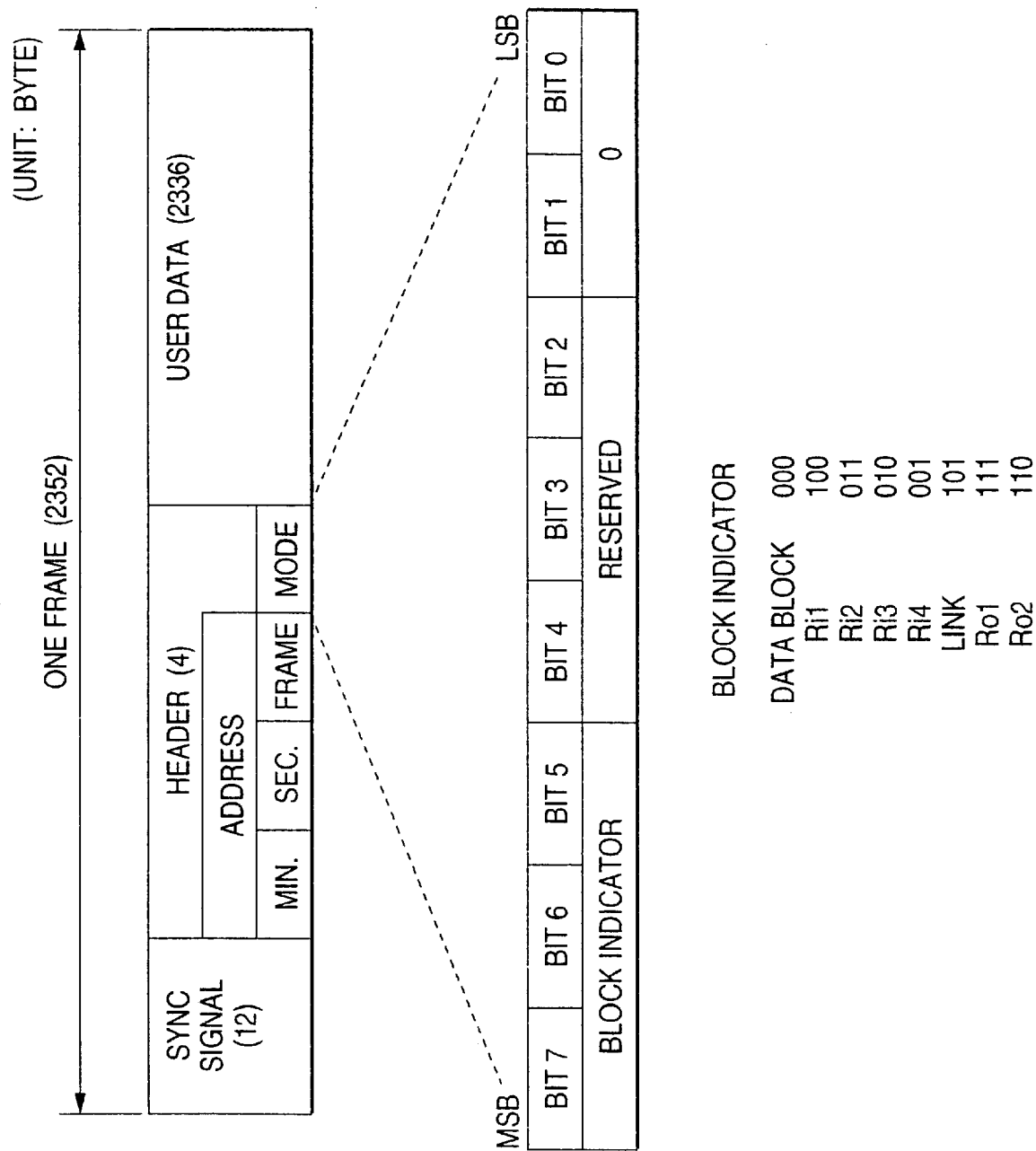
FIG. 4 is a diagram useful in explaining a frame structure of a packet to be recorded onto the CD-R disk.

FIG. 4 is a diagram useful in explaining a frame structure of a packet to be recorded onto the CD-R disk. In the figure, one frame has a data length of 2352 bytes. A first segment ranging from the head of the frame up to 12 bytes stores a sync signal. A second segment of 4 bytes long following the first segment stores a header. A third segment of 2336 bytes long, which follows the second segment, stores user data. 3 bytes of the header, counted from its start, represents an address, and the remaining one byte represents a mode of the frame.

The mode of the frame is represented by 3 bits, which range from bit 7 to bit 5. Those three-bit values are: 000 (data block); 100 (Ri1); 011 (Ri2); 010 (Ri3); 001 (Ri4); 100 (LINK); 111 (Ro1); and 110 (Ro2).

The data recorded by the packet-writing recording method are arranged in accordance with the layout described above. Therefore, if the RUN-OUT located at the end of the packet finally recorded is correctly stored, it can be considered that it is possible to record data onto the disk or the disk accepts the recording of data thereonto.

Figure 1:
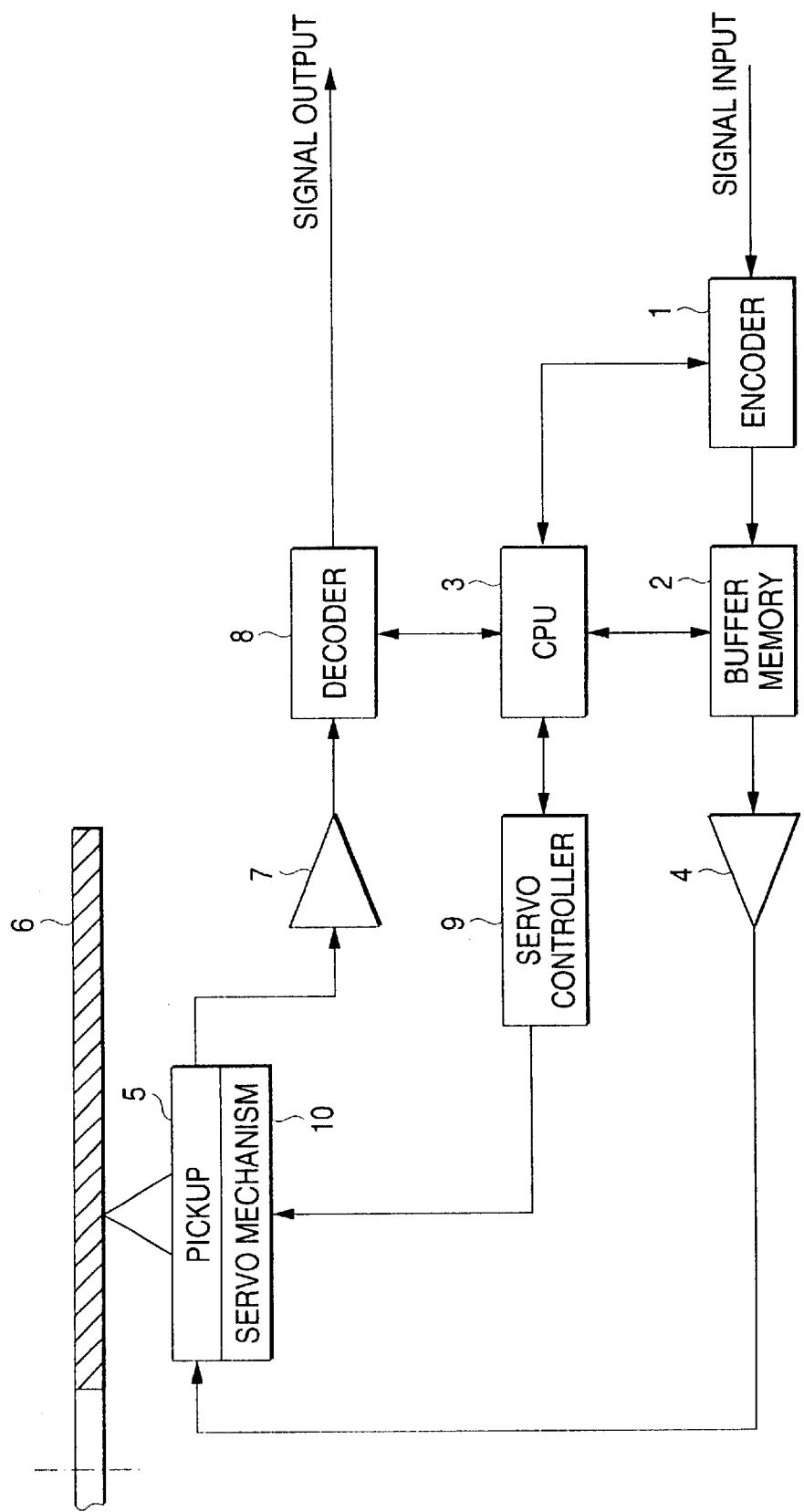
FIG. 1 is a block diagram showing a hardware configuration of a disk device which is constructed according to the present invention.

FIG. 1 is a block diagram showing a hardware configuration of a disk device which is constructed according to the present invention. In the figure, an encoder 1 receives input data to be recorded, modulates it, encodes the modulated one into a record signal, and applies the generated record signal to a buffer memory 2. The buffer memory 2 applies the record signal to a record amplifier 4 in accordance with a control signal received from a CPU 3. The record amplifier 4 amplifies the record signal and applies the amplified one to a pickup 5.

The pickup 5 projects a laser beam onto a disk 6 in accordance with the record signal, to thereby write data onto the disk. The pickup 5 includes a photo detector which receives a light beam reflected from the disk 6 and converts it into a corresponding electrical signal. The electrical signal is applied to an amplifier 7. The amplifier 7 amplifies the received electrical signal and applies the resultant to a decoder 8. The decoder 8 decodes the received signal into data, and supplies the data to the CPU 3 and a signal processing system (not shown).

The CPU 3 sends control signals to a servo controller 9 and the buffer memory 2 by a process procedure to be described later. The servo controller 9 applies a drive signal to a servo mechanism 10 which includes a servo motor, and drives and controls the servo mechanism.

Figure 2:
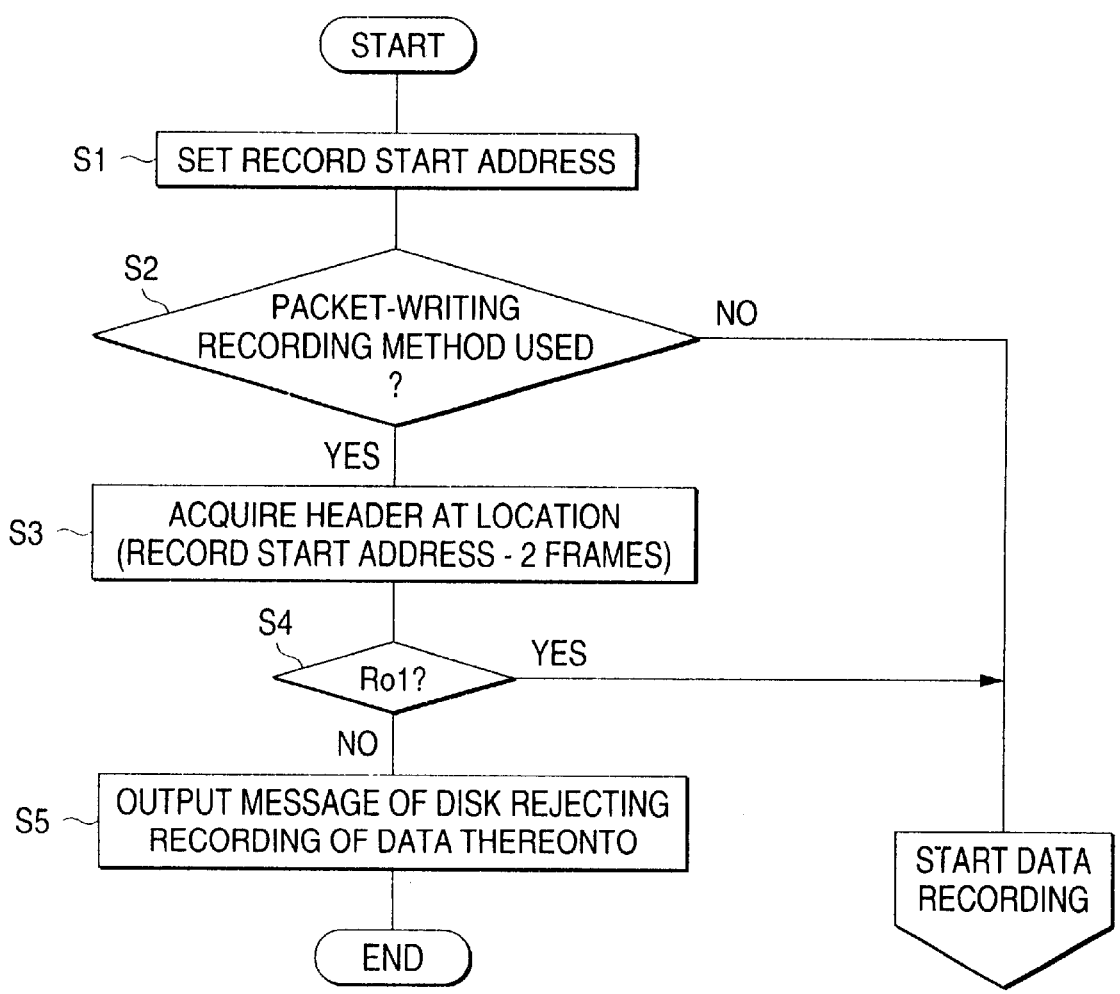
FIG. 2 is a flow chart showing a sequence of procedural steps of a process for recording data onto a disk, which is carried out in the disk device.

FIG. 2 is a flow chart showing a sequence of procedural steps of a process for recording data onto a disk, which is carried out in the disk device. Upon receipt of a record command entered by a user, the CPU 3 sets up a record start address on the basis of the NWA (next writable area), which is read out of the PMA (program memory area) (step S1). Further, the CPU 3 reads out the TDB (track descriptor block) of the track onto which data was finally stored, and judges whether or not the data recording method used for recording data into that track is the track-at-once recording method or the packet-writing recording method (step S2). If the recording method is the packet-writing recording method, the CPU 3 applies a control signal to the servo controller 9 in order to read out the data located at a position precedent to the record start address by two frames, and acquires the header of the frame stored thereat (step S3).

The CPU 3 judges whether or not the mode of the header is Ro1 (111, bit value) (step S4). If it is any other than Ro1, the CPU 3 judges that the final recording was not correct, viz., it is impossible to record data onto the disk, and outputs a message stating that the disk rejects the recording of data thereonto (step S5).

If the recording method is not the packet-writing recording method (step S2), or if the mode of the header is Ro1 (step S4), the CPU 3 judge that the final recording was correct, viz., the disk accepts the recording of data thereonto, and starts to execute the record command.

As seen from the foregoing description, the disk device of the present invention reads out, before data recording, data of a region containing a footer portion of the data finally recorded, and judges as to whether or not the disk accepts or rejects the recording of data thereonto on the basis of predetermined information representative of the footer portion being contained or not contained in the readout data of the region. Therefore, there is no chance that the user uselessly records data onto a disk which rejects the recording of data thereonto.

What is claimed is:

1. A disk device for recording data onto a disk in accordance with a predetermined layout having a footer portion identified by given attribute information, said disk device comprising:

reading means for reading out data from a region containing a footer portion of data finally stored on the disk;

judging means for judging whether or not attribute information indicative of the footer portion is contained in the readout region; and informing means for informing the disk rejecting the recording of data thereonto when said judging means judges that the attribute information is not contained in the region.

2. The disk device according to claim 1, wherein said reading means reads out the data from the region when a recording method of the data finally stored on the disk is a packet-writing recording method.

* * * * *